United States Patent
Lin et al.

(10) Patent No.: US 8,496,493 B2
(45) Date of Patent: Jul. 30, 2013

(54) FIXING FRAME AND FIXING APPARATUS FOR STORAGE DEVICE

(75) Inventors: Wen-Chin Lin, New Taipei (TW); Wen-Chieh Wang, New Taipei (TW); Sheng-Tien Chang, New Taipei (TW); Chin-Ming Chen, New Taipei (TW); Ching-Jou Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/306,859

(22) Filed: Nov. 29, 2011

(65) Prior Publication Data

US 2013/0078838 A1   Mar. 28, 2013

(30) Foreign Application Priority Data

Sep. 27, 2011 (TW) .................................. 100134715

(51) Int. Cl.
*H01R 13/625* (2006.01)
(52) U.S. Cl.
USPC ......................................................... 439/345
(58) Field of Classification Search
USPC   439/345, 377, 97; 411/553, 546; 361/679.02, 361/679.31, 679.33
See application file for complete search history.

(56) References Cited

U.S. PATENT DOCUMENTS

| | | | | |
|---|---|---|---|---|
| 6,067,225 A * | 5/2000 | Reznikov et al. | ........ | 361/679.31 |
| 6,297,954 B1 * | 10/2001 | Seo | .......................... | 361/679.02 |
| 6,304,457 B1 * | 10/2001 | Liu et al. | ....................... | 361/799 |
| 6,396,686 B1 * | 5/2002 | Liu et al. | .................. | 361/679.33 |
| 6,600,648 B2 * | 7/2003 | Curlee et al. | ............. | 361/679.34 |
| 6,612,667 B2 * | 9/2003 | Tsai et al. | .................. | 312/223.1 |
| 6,776,566 B2 * | 8/2004 | Kobusch et al. | ............. | 411/546 |
| 6,853,549 B2 * | 2/2005 | Xu | ............................ | 361/679.39 |
| 6,931,706 B2 * | 8/2005 | McTague et al. | .......... | 29/407.09 |
| 6,948,967 B2 * | 9/2005 | Scherer et al. | ................ | 439/377 |
| 6,980,430 B2 * | 12/2005 | Su | ............................ | 361/679.39 |
| 7,029,293 B2 * | 4/2006 | Shapson et al. | ................. | 439/97 |
| 7,031,150 B2 * | 4/2006 | Chen et al. | ............... | 361/679.33 |
| 7,462,008 B2 * | 12/2008 | Attanasio | ...................... | 411/353 |
| 7,575,203 B2 * | 8/2009 | Lan et al. | ..................... | 248/27.1 |
| 8,282,329 B2 * | 10/2012 | Bowers et al. | ................ | 411/533 |

* cited by examiner

*Primary Examiner* — Alexander Gilman
(74) *Attorney, Agent, or Firm* — Altis Law Group, Inc.

(57) ABSTRACT

An apparatus for fixing a storage device includes a metal bracket, and a fixing frame slidably received in the bracket. The bracket includes two side plates, and one of the side plates forms a resilient tab. The fixing frame includes two opposite fixing arms each defining a latching hole, two resilient members, and two metal fasteners. Each resilient member includes a pad clinging to an inner surface of a corresponding one of the fixing arms, and a projection engaging in the latching hole of the corresponding fixing arm. Each fastener includes a head, and a pin. The heads are received in the corresponding latching holes and abut against outer sides of the corresponding projections. The pins extend through the corresponding through holes for engaging with the storage device. A protrusion extends outwards from one of the heads to contact the resilient tab and connect the storage device to ground.

15 Claims, 4 Drawing Sheets

FIXING FRAME AND FIXING APPARATUS FOR STORAGE DEVICE

BACKGROUND

1. Technical Field

The present disclosure relates to a frame and an apparatus for fixing a storage device.

2. Description of Related Art

An electronic device, such as a computer, generally includes a frame, and a plurality of screws extending through the frame to fix a storage device and connect the storage device to ground. However, these screws are usually small and difficult to handle, the installation of the storage device in the computer is labor-intensive. Additionally, vibrations may easily damage the storage device installed in the frame.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
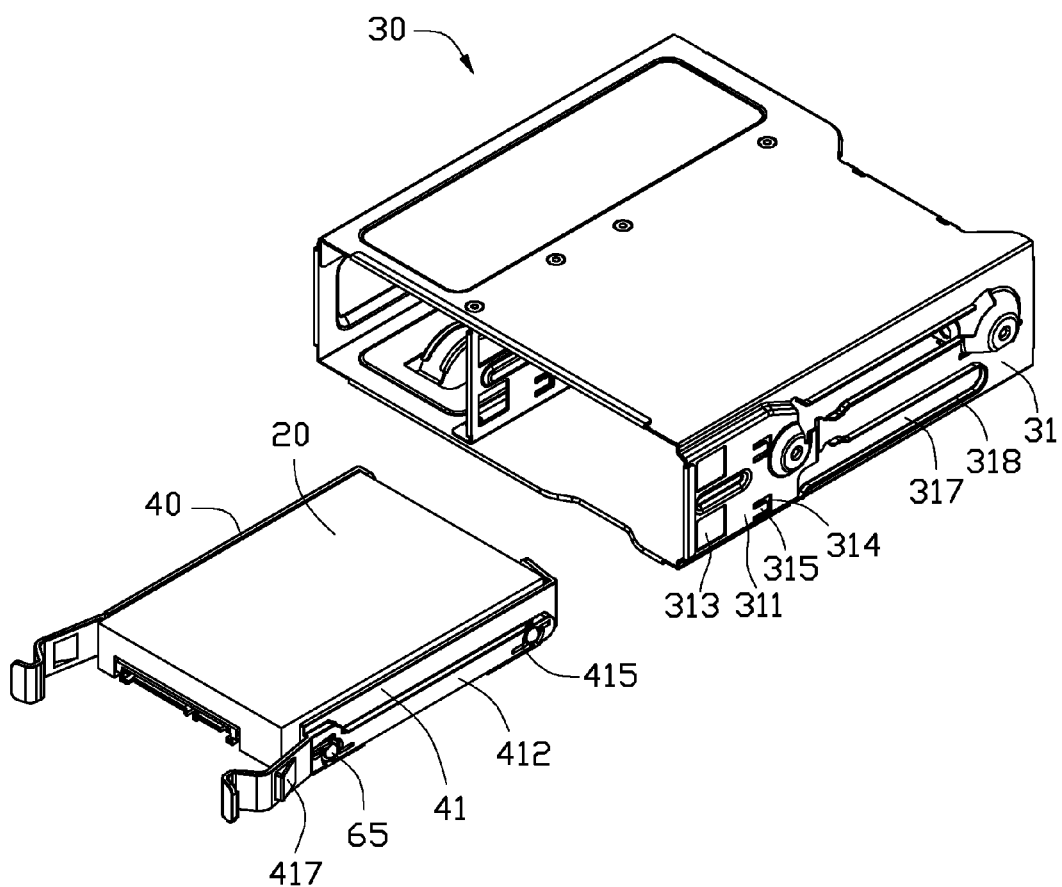
FIG. 1 is an isometric view of an exemplary embodiment of a fixing apparatus together with a storage device, wherein the fixing apparatus includes a bracket and a fixing frame.
Figure 2:
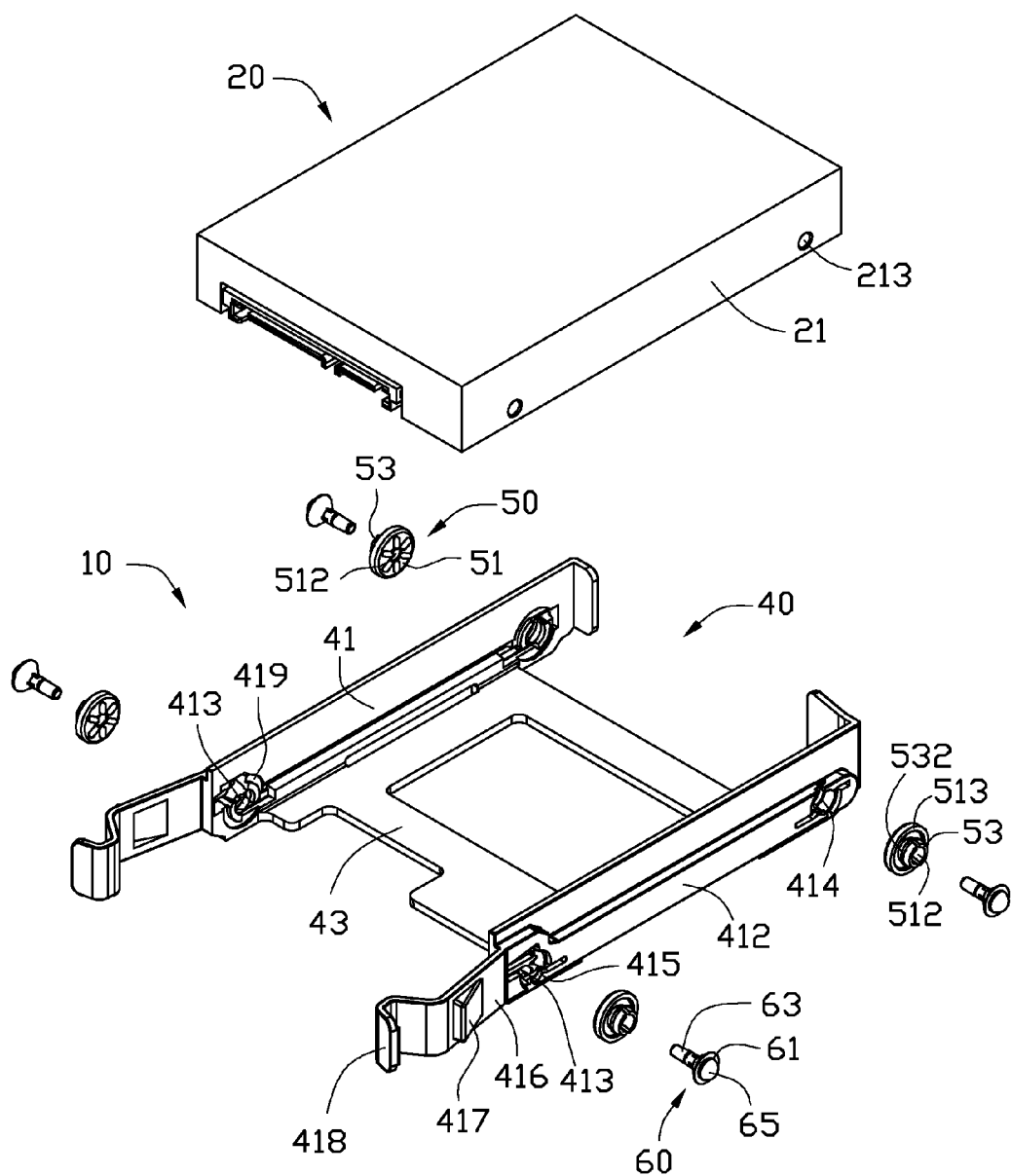
FIG. 2 is an exploded, isometric view of the storage device and the fixing frame of FIG. 1.

Referring to FIGS. 1 and 2, an exemplary embodiment of a fixing apparatus is provided to fix a storage device 20, such as a hard disk drive. The storage device 20 includes two opposite sidewalls 21. Two spaced fixing holes 213 are defined in each sidewall 21. The fixing apparatus includes a bracket 30 and a fixing frame 10.

The bracket 30 is made of sheet metal, and installed in a chassis (not shown) of an electronic device, and connects to ground via the chassis. The bracket 30 includes two opposite side plates 31. A convex mounting portion 311 is stamped outwards from the front section of each side plate 31. A latching slot 313 is defined in each mounting portion 311 adjacent to the front end of the mounting portion 311. A resilient tab 315 bound by a substantially U-shaped slot 314 is stamped out from each mounting portion 311 behind the corresponding latching slot 313. An elongated horizontally extending slide slot 317 is defined in each side plate 31 behind the corresponding mounting portion 311. A substantially U-shaped retaining portion 318 perpendicularly extends outwards from each side plate 31 surrounding the top, bottom, and rear sides of the corresponding slide slot 317.

The fixing frame 10 includes a framework 40, four resilient members 50, and four fasteners 60.

The framework 40 is made of plastic material, and includes two opposite resilient fixing arms 41 and a bottom plate 43 connected between the bottoms of the fixing arms 41. An elongated longitudinally extending slide rail 412 is formed on the outer surface of each fixing arm 41. Two latching holes 413 are defined in each fixing arm 41 through out the corresponding slide rail 412. A circular step surface 414 facing outwards is formed on the inner surface of each latching hole 413. Two staggered cantilevers 415 are formed on an outer side of each slide rail 412 at opposite sides of each latching hole 413, with the distal end of each cantilever 415 extending towards the adjacent latching hole 413. Two circular slots 419 are defined in the inner surface of each fixing arm 41, and respectively surround the latching holes 413. A resilient latch 416 extends forward from the front end of each fixing arm 41. A block 417 protrudes out from the outer surface of each latch 416. An operation portion 418 is formed on the front end of each latch 416.

Each resilient member 50 is made of rubber and includes a circular pad 51 and a cylindrical projection 53 extending from the middle of a side of the pad 51. A through hole 512 is defined in the middle of the pad 51 through the projection 53. A circular flange 513 extends from a circumference of the pad 51 toward the projection 53. A circular latching portion 532 extends outwards from a middle section of a circumference of the projection 53.

Each fastener 60 is made of electrically conducting metal, and includes a cone-shaped head 61, a pin 63 extending from the middle of a conical surface of the head 61, and a domed protrusion 65 extending outwards from a side of the head 61 opposite to the pin 63.

To assemble the fixing frame 10, the projections 53 are respectively inserted into the latching holes 413 from the inner side of the fixing arms 41, with the latching portions 532 deformed. The resilient members 50 are pressed toward the corresponding fixing arms 41, until the pads 51 cling to the inner surfaces of the corresponding fixing arms 41, and the circular flanges 513 engage in the corresponding circular slots 419. The latching portions 532 are restored to engage with the corresponding step surfaces 414. Thereby, the resilient members 50 are respectively fixed to the fixing arms 41. The cantilevers 415 are deformed outwards, to allow the pins 63 to respectively extend through the latching holes 413 and the through holes 512 and expose out of the inner surfaces of the corresponding fixing arms 41. The conical surfaces of the heads 61 facing the pins 63 abut against distal ends of the corresponding projections 53. The cantilevers 415 are restored to abut against the outer sides of the corresponding heads 61 opposite to the pins 63. Thereby, the fasteners 60 are respectively fixed to the fixing arms 41. Each protrusion 65 is exposed out of the corresponding fixing arm 41 from a space between two corresponding cantilevers 415.

Figure 3:
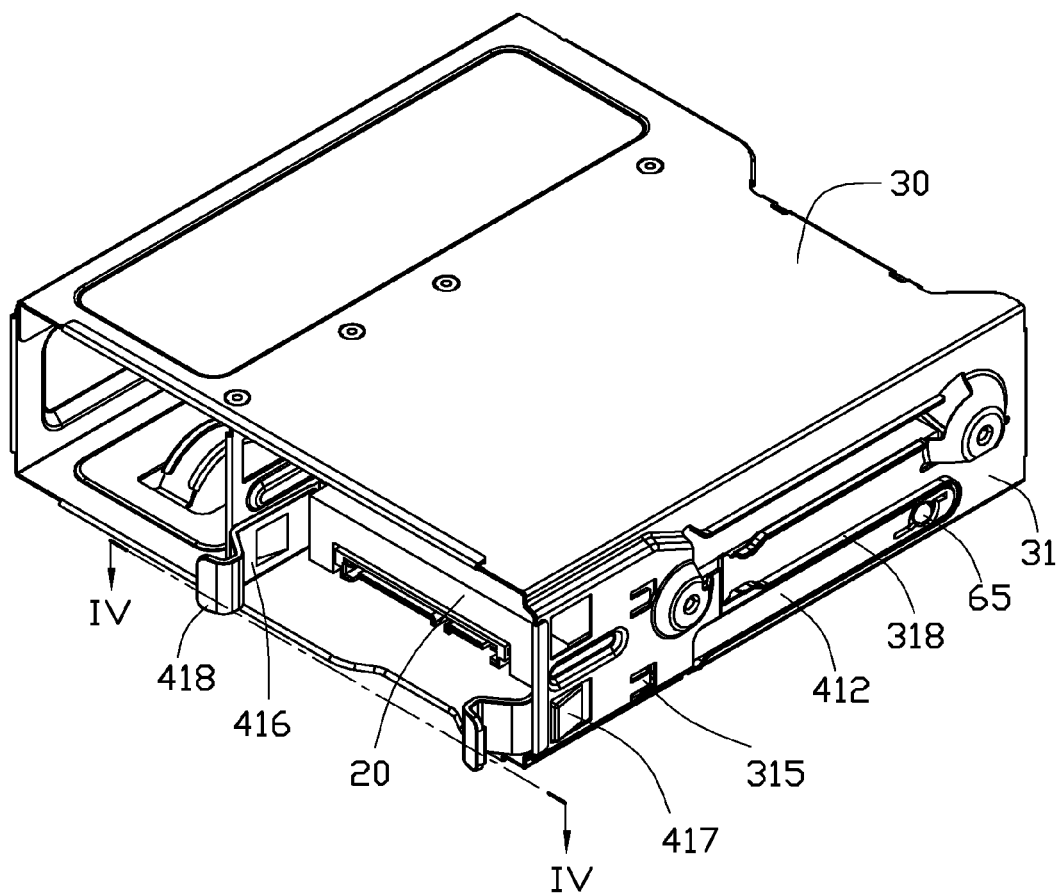
FIG. 3 is an assembled, isometric view of FIG. 1.
Figure 4:
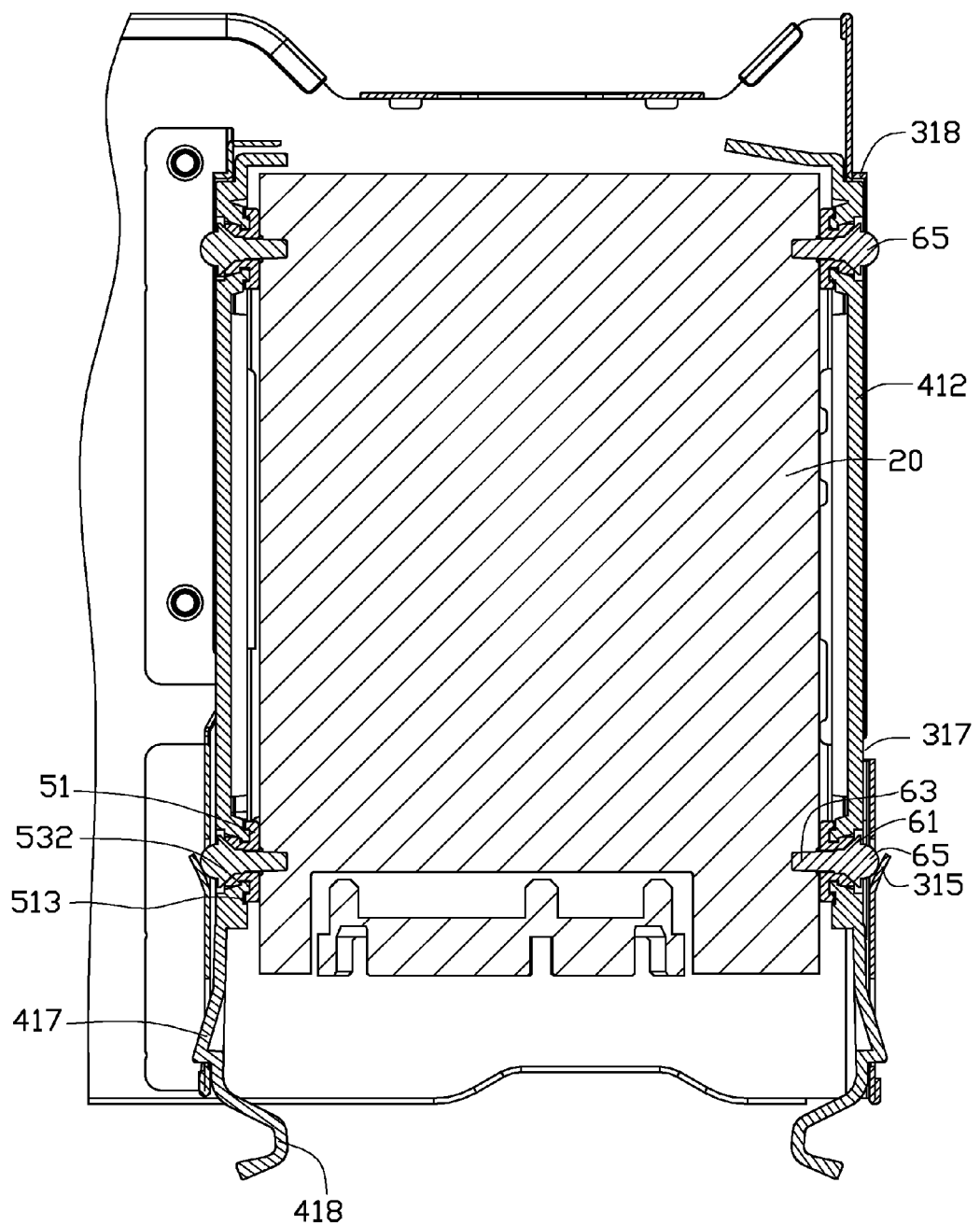
FIG. 4 is a cross-sectional view taken along the line IV-IV of FIG. 3.

Referring to FIGS. 3 and 4, to fix the storage device 20, the fixing arms 41 are deformed away from each other, and the storage device 20 is placed on the bottom plate 43, with the fixing holes 213 respectively aligning with the pins 63. The fixing arms 41 are restored, to allow the pins 63 to respectively engage in the fixing holes 213. Thereby, the storage device 20 is fixed to the fixing frame 10.

The fixing frame 10 is inserted into a space of the bracket 30 between the side plates 31 from the front side of the bracket 30. The slide rails 412 extend through the corresponding mounting portions 311 and the slide slots 317, and slidably engage in the corresponding retaining portions 318. The blocks 417 abut against the corresponding mounting portions 311, and make the latches 416 deform inwards. The fixing frame 10 is further slid rearwards, until the rear ends of the slide rails 412 engage with the rear ends of the corresponding retaining portions 318. The latches 416 are restored, to allow the blocks 417 to engage in the corresponding latching slots 313. Thereby, the fixing frame 10 is fixed to the bracket 30. The protrusions 65 of two fasteners 60 at the front end of the fixing frame 10 engage with the corresponding resilient tabs 315, and connect the storage device 20 to ground via the bracket 30.

In the embodiment, the pads 51 are sandwiched between the storage device 20 and the corresponding fixing arms 41, which can absorb shock between the storage device 20 and the fixing frame 40. Furthermore, the protrusion 65 and the head 61 of each of the two fasteners 60 at the front end of the fixing frame 10 are sandwiched between the corresponding resilient tab 315 and projection 53, the resilient tab 315 and the projection 53 can absorb shock between the bracket 30 and the fixing frame 10.

To detach the storage device 20, the operation portions 418 are pressed towards each other, to allow the latches 416 to deform inwards, and to allow the blocks 417 to disengage from the corresponding latching slots 313. The fixing frame 10 is pulled out of the bracket 30. The fixing arms 41 are deformed away from each other, to allow the pins 63 to disengage from the corresponding fixing holes 213. Thereby, the storage device 20 can be detached from the fixing frame 10.

Even though numerous characteristics and advantages of the embodiments have been set forth in the foregoing description, together with details of the structure and the functions of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A fixing frame for a storage device, the storage device comprising two opposite sidewalls each defining a fixing hole, the fixing frame comprising:
   a framework comprising two opposite fixing arms each defining a latching hole, two staggered cantilevers formed on an outer side of each fixing arm at opposite sides of the corresponding latching hole;
   two resilient members respectively fixed to the fixing arms, each resilient member comprising a pad clinging to an inner surface of a corresponding one of the fixing arms, a projection extending from the pad and engaging in the latching hole of the corresponding fixing arm, and a through hole defined in the pad through out the projection; and
   two fasteners made of electrically conducting metal, each fastener comprising a head, a pin extending from an inner surface of the head, and a protrusion extending from an outer surface of the head, wherein the heads are respectively received in the latching holes of the corresponding fixing arms, and abut against outer sides of the corresponding projections away from the pads, the protrusions are exposed out of the corresponding fixing arms, and the pins extend through the through holes of the corresponding resilient members for engaging in a corresponding one of the fixing holes of the storage device, distal ends of the cantilevers extend towards the corresponding latching hole and abut against the outer surface of the head of the corresponding fastener, and the protrusion of the corresponding fastener is exposed out of the fixing arm from a space between the cantilevers.

2. The fixing frame of claim 1, wherein a circular step surface facing outwards is formed on an inner surface of each latching hole, each projection is cylindrical, and a circular latching portion extends from a middle section of a circumference of each projection, to engage with the step surface of the corresponding latching hole.

3. The fixing frame of claim 1, wherein a circular slot is defined in the inner surface of each fixing arm, and surrounds the corresponding latching hole, each pad is circular, and a circular flange extends from a circumference of each pad, to engage in the circular slot of the corresponding fixing arm.

4. The fixing frame of claim 1, wherein the framework further comprises a bottom plate connected between the bottoms of the fixing arms, for supporting the storage device.

5. The fixing frame of claim 1, wherein the resilient members are made of rubber.

6. A fixing apparatus for a storage device, the storage device comprising two opposite sidewalls each defining a fixing hole, the fixing apparatus comprising:
   a bracket comprising two opposite side plates made of electrically conducting metal and connected to ground, one of the side plates forms a resilient tab, an elongated horizontally extending slide slot defined in each side plate, a substantially U-shaped retaining portion perpendicularly extending from each side plate surrounding the top, bottom, and rear sides of the corresponding slide slot; and
   a fixing frame slidably received in the bracket, the fixing frame comprising:
     a framework comprising two opposite fixing arms each defining a latching hole;
     two resilient members respectively fixed to the fixing arms, each resilient member comprising a pad clinging to an inner surface of a corresponding one of the fixing arms, a projection extending from an outer surface of the pad to engage in the latching hole of the corresponding fixing arm, and a through hole defined in the pad through the projection; and
     two fasteners made of electrically conducting metal, each fastener comprising a head, and a pin extending from an inner surface of the head, wherein the heads are respectively received in the latching holes of the corresponding fixing arms and abut against outer sides of the corresponding projections away from the pads, the pins extend through the through holes of the corresponding resilient members for engaging in a corresponding one of the fixing holes of the storage device, a protrusion extends outwards from an outer surface of one of the heads and contacts the resilient tab, for connecting the storage device to ground, an elongated longitudinally extending slide rail is formed on an outer surface of each fixing arm, and the slide rails of the fixing arms are slidably received in the retaining portions, respectively.

7. The fixing apparatus of claim 6, wherein the resilient tab is bound by a substantially U-shaped slot.

8. The fixing apparatus of claim 6, wherein a latching slot is defined in each side plate before the corresponding retaining portion, a resilient latch extends forwards from a front end of each fixing arm, and a block protrudes out from an outer surface of each latch, to engage in the latching slot of a corresponding one of the side plates.

9. The fixing apparatus of claim 8, wherein each retaining portion perpendicularly extends out from the corresponding side plate, a convex mounting portion is stamped outwards from a front section of each side plate, the latching slots are respectively defined in the mounting portions, and the resilient tab is formed on one of the mounting portions.

10. The fixing apparatus of claim 8, wherein an operation portion is formed on a front end of each latch.

11. The fixing apparatus of claim 6, wherein the latching holes are respectively defined in the fixing arms through out the corresponding slide rails.

12. The fixing apparatus of claim 11, wherein two staggered cantilevers are formed on an outer side of each slide rail at opposite sides of the corresponding latching hole, distal ends of the cantilevers extend towards the corresponding latching hole and abut against the outer surface of the head of the corresponding fastener, the protrusion of one of the fasteners is exposed out of the corresponding fixing arm from a space between the cantilevers.

13. The fixing apparatus of claim 6, wherein a circular step surface facing outwards is formed on an inner surface of each latching hole, each projection is cylindrical, and a circular latching portion extends from a middle section of a circumference of each projection, to engage with the step surface of the corresponding latching hole.

14. The fixing apparatus of claim 6, wherein a circular slot is defined in the inner surface of each fixing arm, and surrounds the corresponding latching hole, each pad is circular, and a circular flange extends from a circumference of each pad, to engage in the circular slot of the corresponding fixing arm.

15. The fixing apparatus of claim 6, wherein the framework further comprises a bottom plate connected between the bottoms of the fixing arms, for supporting the storage device.

\* \* \* \* \*